United States Patent [19]

Tzakis

[11] Patent Number: 5,766,472
[45] Date of Patent: Jun. 16, 1998

[54] METHOD AND APPARATUS FOR A FILTER ASSEMBLY

[75] Inventor: Peter Tzakis, Naperville, Ill.

[73] Assignee: Illinois Tool Works Inc., Glenview, Ill.

[21] Appl. No.: 738,642

[22] Filed: Oct. 29, 1996

[51] Int. Cl.⁶ .................................................. B01D 29/05
[52] U.S. Cl. .......................... 210/485; 210/495; 210/498;
210/499; 264/156; 264/255; 264/273; 264/274;
264/DIG. 48; 55/495; 55/502; 55/DIG. 5;
55/DIG. 31
[58] Field of Search ............................ 264/255, 153,
264/156, 274, 273, DIG. 48; 210/497.01,
497.3, 499, 483, 484, 485, 495, 498; 55/DIG. 5,
DIG. 31, 495, 502

[56] References Cited

U.S. PATENT DOCUMENTS

| | | |
|---|---|---|
| 3,592,126 | 7/1971 | Dombrowik ........................ 210/474 |
| 4,113,627 | 9/1978 | Leason . |
| 4,374,026 | 2/1983 | Greutert . |
| 4,608,166 | 8/1986 | Cain . |
| 4,826,598 | 5/1989 | Cain . |
| 4,828,694 | 5/1989 | Leason . |
| 4,882,055 | 11/1989 | Stamstad . |
| 4,950,403 | 8/1990 | Hauff et al. . |
| 5,049,274 | 9/1991 | Leason et al. . |
| 5,252,204 | 10/1993 | Chiodo . |
| 5,266,194 | 11/1993 | Chiodo . |
| 5,342,423 | 8/1994 | Taft ............................................. 55/483 |
| 5,417,906 | 5/1995 | Chiodo . |
| 5,429,742 | 7/1995 | Gutman et al. ........................ 210/484 |
| 5,593,580 | 1/1997 | Kopf ........................................ 210/456 |

Primary Examiner—W. L. Walker
Attorney, Agent, or Firm—Schwartz & Weinrieb

[57] ABSTRACT

A method and apparatus for a filter assembly having a filter element with a plurality of openings encapsulated in a filter element carrier in a first molding operation, which may include formation of first and second channels on first and second side portions of the filter element carrier. One or more first holes are also formed through the filter element carrier in the first operation, wherein the first holes interconnect the first side portion of the filter element carrier and the second side portion of the filter element carrier so as to expose filter element portions encapsulated therebetween. A first sealing element is formed on the first side portion of the filter element and a second sealing element is formed on the second side portion of the filter element with a molten sealing element material in a second molding operation. The first sealing element formed on the first side portion of the filter element carrier is interconnected to the second sealing element formed on the second side portion of the filter element carrier by a third sealing element formed through openings of the filter element portion exposed by the first holes through the filter element carrier so as to form a unitary sealing element.

14 Claims, 2 Drawing Sheets

METHOD AND APPARATUS FOR A FILTER ASSEMBLY

FIELD OF THE INVENTION

The invention relates generally to filter assemblies, and more particularly to fluid filter assemblies having a filter element encapsulated in a filter element carrier with a sealing element disposed on opposite sides thereof. The invention also relates to molding processes for producing the filter assemblies.

BACKGROUND OF THE INVENTION

Filter assemblies of the type having a filter element retained in a filter element carrier with a sealing element disposed on opposite sides of the filter element carrier and about an enclosed portion of the filter element are known. The filter assembly is mounted generally between opposed mounting members that engage and slightly deform the sealing elements on opposite sides of the filter element carrier so as to form a fluid seal therebetween. One or more bushings, usually made from metal, may also be encapsulated in the filter element carrier so as to facilitate mounting the filter assembly. These types of filter assemblies are installed, for example, between opposed metal or plastic module housings of an automotive transmission, wherein fluid flow between the housings is contained by the sealing elements and directed through the filter element. The filter element is generally a nylon mesh screen and the filter element carrier is a nylon frame member with a rubber gasket member disposed and retained on opposite sides of the nylon frame about the nylon mesh screen.

According to one method of manufacturing these filter assemblies, the filter element and bushings are positioned, or inserted, into a filter element carrier mold cavity before injecting a molten filter element carrier material in a first molding operation, wherein the filter element and bushings are encapsulated in the filter element carrier. A recess or channel is usually formed on opposite sides of the filter element carrier about the filter element for seating the sealing element, which is formed in a subsequent operation discussed below. The partially assembled filter assembly including the filter element encapsulated in the filter element carrier is then subject to a secondary trimming operation wherein a plurality of holes are formed through the filter element carrier and through portions of the filter element encapsulated within the filter element carrier. The plurality of holes interconnect the channels on opposite sides of the filter element carrier. After the secondary trimming operation, the partially assembled filter assembly is inserted into a sealing element mold cavity before injecting a molten sealing element material in a second molding operation, wherein the sealing members are formed in the corresponding channels on the opposite sides of the filter element carrier. During the second injection molding operation, the molten sealing element material flows through the plurality of holes in the filter element carrier so as to form transverse elements that interconnect the sealing elements disposed in the corresponding channels on the opposite sides of the filter element carrier. The interconnected sealing elements thus form a unitary member, which is disposed and retained on the opposite sides of the filter element carrier by the transverse elements. The secondary trimming operation, however, requires a trimming tool like a punch and die assembly, which aligns the partially assembled filter assembly and forms the plurality of holes therethrough. The trimming tool is costly, and the secondary trimming operation requires additional personnel, which increase production costs resulting in a relatively costly filter assembly.

In view of the discussion above among other considerations, there exists a demonstrated need for an advancement in the art of filter assemblies.

OBJECTS OF THE INVENTION

It is therefore an object of the invention to provide novel methods and apparatus for filter assemblies that overcome problems in the prior art.

It is also an object of the invention to provide novel methods and apparatus for filter assemblies having a filter element encapsulated in a filter element carrier with a sealing element disposed on first and second sides of the filter element carrier.

It is another object of the invention to provide novel methods and apparatus for filter assemblies mountable between opposed mounting members, and more particularly filter assemblies usable in automotive transmission applications, and still more particularly filter assemblies mountable between opposed metal and plastic module housings of automotive transmissions.

It is another object of the invention to provide novel methods for making filter assemblies manufactured in two operations, wherein a filter element is encapsulated in a filter element carrier in the first operation and a unitary sealing element is formed on first and second sides of the filter element carrier in the second operation.

It is a further object of the invention to provide novel methods and apparatus for filter assemblies having a filter element encapsulated in a filter element carrier with a unitary sealing element disposed on first and second sides of the filter element carrier, wherein the unitary sealing element is formed on first and second side portions of the filter element carrier by flowing a molten sealing element material through openings in one or more filter element portions exposed by one or more holes through the filter element carrier, and more particularly wherein the unitary sealing element is disposed at least partially in first and second channels formed on first and second side portions of the filter element carrier by flowing a molten sealing element material through openings in one or more filter element portions exposed by one or more holes through the filter element carrier.

It is a still further object of the invention to provide novel methods for making filter assemblies by forming one or more first holes through a filter element carrier in a first operation to expose a filter element portion encapsulated in the filter element carrier, and forming one or more second holes through the filter element carrier in the first operation in areas of the filter element carrier where the encapsulated filter element is not exposed, and injecting molten sealing element material from one or more input gates into the one or more second holes in a second operation so as to form a first sealing element on a first side portion of the filter element carrier and to form a second sealing element on a second side portion of the filter element carrier.

It is yet another object of the invention to provide novel methods for making filter assemblies that includes aligning a filter element in a filter element carrier mold by disposing a pilot pin of the filter element carrier mold through a pilot hole of the filter element, disposing opposed pin members of the filter element carrier mold in contact with opposite side portions of the filter element, and injecting a molten filter element carrier material into the filter element carrier mold so as to encapsulate the filter element in the filter element carrier in a first operation, wherein the opposed pin members form one or more holes through the filter element carrier so as to expose encapsulated filter element portions therebetween.

BRIEF DESCRIPTION OF THE DRAWINGS

These and other objects, features and advantages of the present invention will become more fully apparent upon consideration of the following Detailed Description of the Invention with the accompanying Drawings, which may be disproportionate for ease of understanding, wherein like structure and steps are referenced by corresponding numerals and indicators, throughout the several views, and wherein:

FIG. 1 also shows, toward the right side, a first partial break-away view of a partial filter assembly including the filter element and the filter element carrier, and, toward the upper central portion, a second partial break-away view of the filter element encapsulated in the filter element carrier.

DETAILED DESCRIPTION OF THE INVENTION

Figure 1:
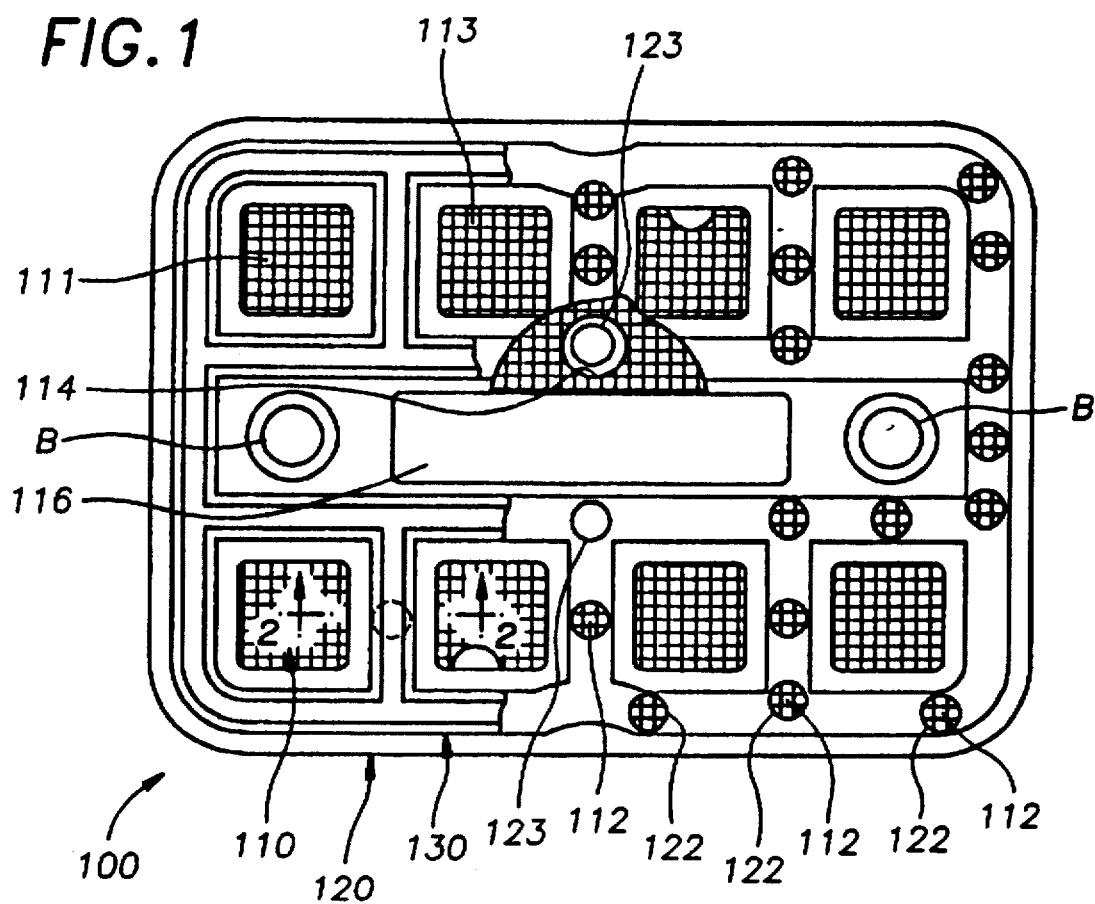
FIG. 1 is a plan view of a filter assembly including a filter element encapsulated in a filter element carrier with a unitary sealing element disposed on first and second sides of the filter element carrier.
Figure 2:
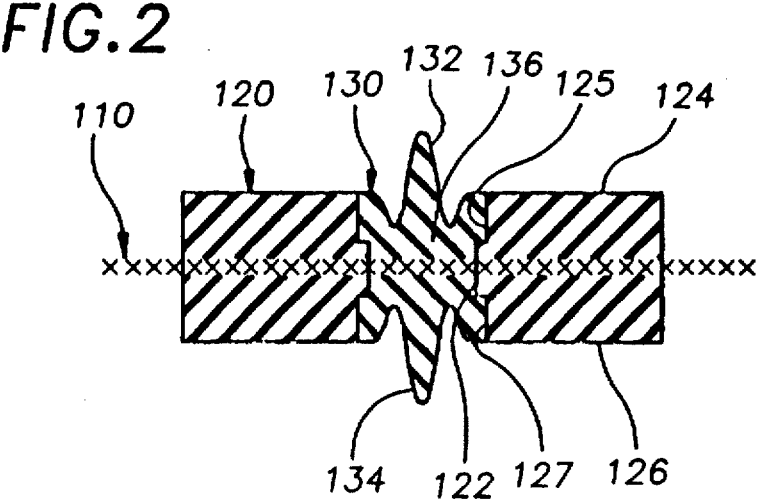
FIG. 2 is a partial sectional view of the filter assembly taken along lines 2–2 of FIG. 1.

FIG. 1 is a plan view of a filter assembly 100 including a filter element 110 having a plurality of openings, wherein the filter element 110 is encapsulated in a filter element carrier 120. FIG. 2 shows one or more first holes 122 extending through the filter element carrier 120, and a sealing member 130 having a first sealing element 132 formed on a first side portion 124 of the filter element carrier 120 and a second sealing element 134 formed on a second side portion 126 of the filter element carrier 120. In one embodiment, the sealing elements 132 and 134 are arranged to enclose one or more portions of the filter element 110. In FIG. 1, for example, the sealing member 130 encloses six portions of the filter element 110 including enclosed portions 111 and 113. The one or more first holes 122 interconnect the first side portion 124 and the second side portion 126 of the filter element carrier 120 so as to expose corresponding filter element portions 112 therebetween. The first and second sealing elements 132 and 134 are interconnected by a third sealing element 136 disposed through the one or more first holes 122 and through openings in the filter element portions 112 exposed by the first holes 122, wherein the first, second and third sealing elements form a unitary sealing element.

In an alternative embodiment, the filter element carrier 120 includes one or more second holes 123 in addition to or instead of the one or more first holes 122. The one or more second holes 123 are formed through the filter element carrier 120 so as to interconnect the first side portion 124 and the second side portion 126 of the filter element carrier 120 similar to the first holes 122. But unlike the first holes 122, the second holes 123 are formed through the filter element carrier 120 in areas where the filter element 110 encapsulated in the filter element carrier 120 is not exposed by the second holes 123. FIG. 1 shows the filter element 110 having a cut-out or removed portion 114 corresponding to a second hole 123 through the filter element carrier 120 for this purpose.

According to another aspect of the invention shown in FIG. 2, the first and second sealing elements 132 and 134 are disposed at least partially in corresponding first and second channels 125 and 127 formed on corresponding first and second side portions 124 and 126 of the filter element carrier 120. The channels 125 and 127 are generally arranged to enclose one or more portions of the filter element 110 as discussed above. In alternative embodiments, a channel is disposed on only one side of the filter element carrier 120, wherein one of the first and second sealing elements 132 and 134 is disposed at least partially in the channel formed in the filter element carrier 120.

The one or more first holes 122 interconnect the first channel 125 and the second channel 127 so as to expose a corresponding filter element portion 112 between the first channel 125 and the second channel 127. According to this configuration, the first and second sealing elements 132 and 134 are interconnected by one or more third sealing elements 136 disposed through corresponding first holes 122 and through openings in the filter element portions 112 so as exposed by the first holes 122 to form the unitary sealing element. The one or more second holes 123 also interconnect the first channel 125 and the second channel 127 but do not expose any filter element portion as discussed above. And according to this alternative configuration, the first and second sealing elements 132 and 134 are interconnected by one or more third sealing elements 136 disposed through corresponding second holes 123 so as to form the unitary sealing element.

According to one aspect of a method for making the filter assembly 100, a partially assembled filter assembly including the filter element 110 encapsulated in the filter element carrier 120 is formed in a first molding operation. Also formed in the first molding operation are the one or more first holes 122 through the filter element carrier 120, which expose the filter element portions 112 encapsulated in the filter element carrier 120, and the one or more second holes 123 through the filter element carrier 120, which are both shown in FIG. 1. The first and second channels 125 and 127 on the first and second side portions 124 and 126 of the filter element carrier 120 are also formed in the first molding operation. Mounting bushings B and other members may also be encapsulated in the filter element carrier 120 in the first molding operation.

Figure 3A:
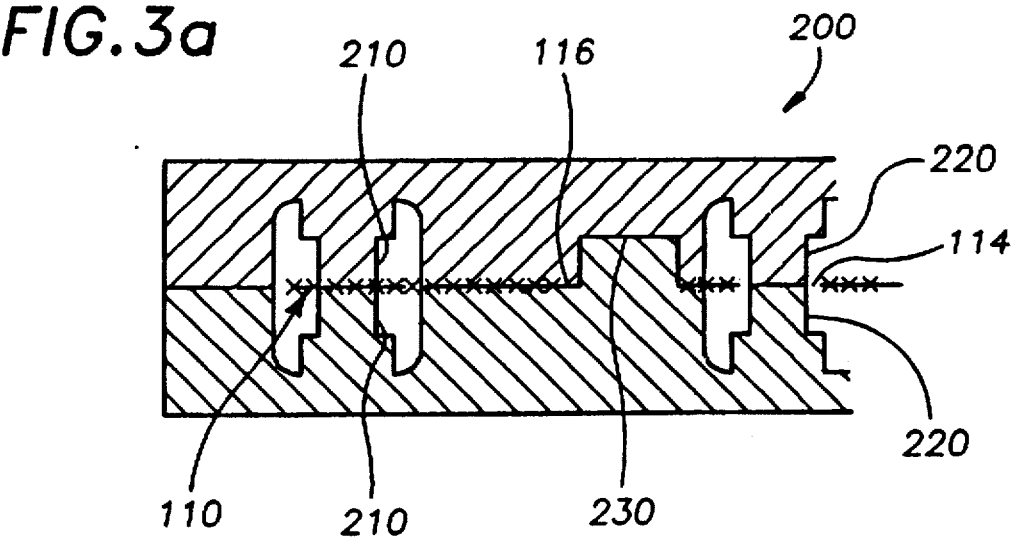
FIG. 3a is a partial sectional view of a filter element carrier mold useable for practicing a first operation of the present invention.

FIG. 3a is a partial sectional view of a filter element carrier mold 200 useable for making the partial filter assembly in the first molding operation, wherein the filter element 110 is disposed in the filter element carrier mold 200, and a molten filter element carrier material is injected into the filter element carrier mold 200 so as to form the filter element carrier 120 and to encapsulate the filter element 110 in the filter element carrier 120. The one or more first holes 122 in the filter element carrier 120 are formed by disposing corresponding opposed pins members 210 of the filter element carrier mold 200 in contact with opposite side portions of the filter element 110 during the first molding operation. The opposed pin members 210 are positioned so as to apply adequate pressure on the opposite sides of filter element 110 to prevent seepage, or flashing, of molten filter element carrier material into the filter element. The pin members 210 however do not apply enough pressure to damage or deform the openings of the filter element 110. The preferred pressure ranges are necessarily dependent on the material of the filter element and are readily ascertainable without undue experimentation. For nylon mesh screen filter elements, for example, the filter element 110 is compressed by a defined percentage of its original thickness by the opposed pin members 210, which is approximately 30 percent in one application, to obtain the desired effect. The one or more second holes 123 through the filter element carrier 120 are formed by disposing opposed pin members 220 of the filter element carrier mold 200 in direct contact with each other through corresponding openings 114 in the filter element 110 during the first molding operation.

In the exemplary embodiment shown in FIG. 1, a plurality of first holes 122 are formed through the filter element carrier 120 in the first molding operation so as to expose corresponding filter element portions 112, and one or more second holes 123 are formed through the filter element carrier 120 so as to facilitate formation of the sealing element 130 in a second molding operation discussed below. In another embodiment, only the first holes 122 are formed through the filter element carrier 120, wherein each of the first holes 122 exposes a corresponding filter element portion 112 of the filter element 110. And in another embodiment, only the second holes 123 are formed through the filter element carrier 120, wherein each of the second holes 123 is aligned with a corresponding aperture 114 in the filter element 110.

The filter element 110 is aligned in the filter element carrier mold 200 by disposing an alignment or pilot pin 230 of the mold 200 through a pilot hole or aperture 116 of the filter element 110 shown in FIGS. 1 and 2. The apertures, or openings, 114 of the filter element 110 may be oversized so as to facilitate insertion and positioning of the filter element 110 in the mold 200 without requiring precise alignment. Generally, the filter element 110 must be positioned more precisely in the mold 200 as the number of apertures 114 increases so as to ensure proper alignment of the apertures 114 with the pin members 220 of the mold 200. In applications where the second holes 123 are used primarily for injecting the molten sealing element material, there are generally not more than two or three or four apertures 114 in the filter element 110 so that alignment of the filter element 110 in the mold 200 is not a factor critically affecting production efficiency. The filter element 110 may be formed or cut from a sheet of the desired filter element material in a stamping operation at which time any apertures 114 and pilot holes 116 are formed.

According to another aspect of the method for making the filter assembly 100, a molten sealing element material is conducted through openings of the filter element portions 112 exposed by the one or more first holes 122 through the filter element carrier 120 so as to form the third sealing element 136 in a second molding operation. According to this aspect of the invention, the first sealing element 132 formed on the first side portion 124 of the filter element carrier 120 is interconnected to the second sealing element 134 formed on the second side portion 126 of the filter element carrier 120 by one or more third sealing elements 136 formed through openings of the filter element portions 112 exposed by the one or more first holes 122 through the filter element carrier 120. The first sealing element 132 is thus bonded to the second sealing element 134 by the third sealing elements 136, which also retain the first and second sealing elements 132 and 134 on the filter element carrier 120. In embodiments where the filter element carrier 120 includes channels 125 and 127, the first and second sealing elements 132 and 134 are disposed at least partially in the first and second channels 125 and 127, respectively, in the second molding operation. According to this configuration, shown in FIGS. 1 and 2, the first sealing element 132 at least partially disposed in the first channel 125 is interconnected to the second sealing element 134 at least partially disposed in the second channel 127 by one or more third sealing elements 136, which are formed through openings in the filter element portion 112 exposed by the one or more first holes 122 interconnecting the first channel 125 and the second channel 126.

Figure 3B:
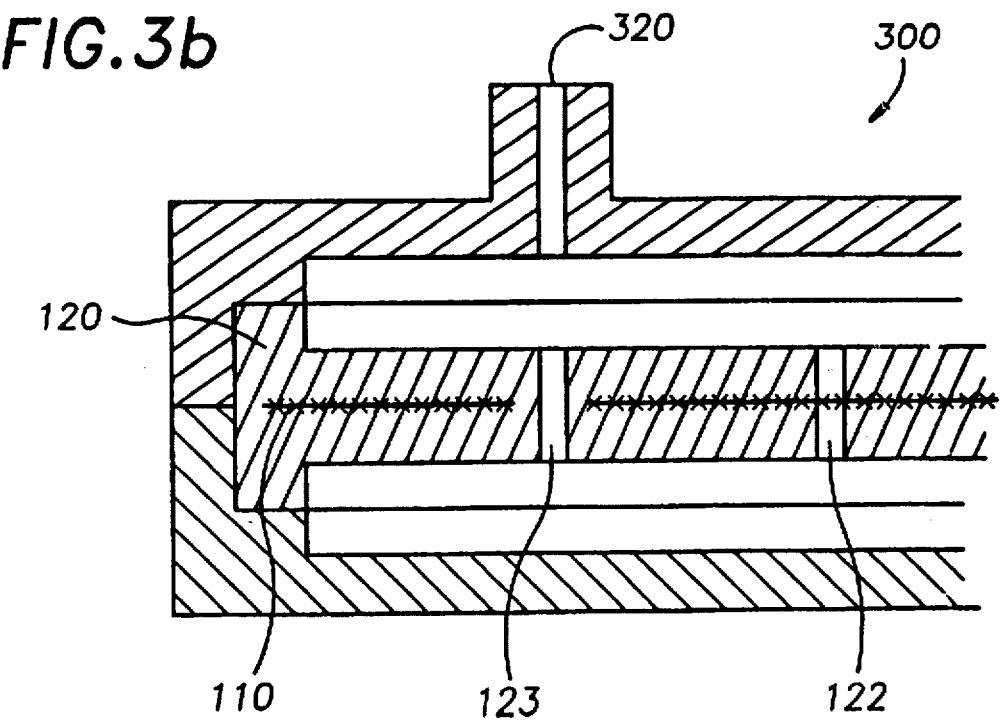
FIG. 3b is a partial sectional view of a sealing element mold useable for practicing a second operation of the present invention.

FIG. 3b shows a partially assembled filter assembly disposed in a sealing element mold 300 useable for forming the sealing element 130 on the partially assembled filter, wherein the first and second sealing elements 132 and 134 are formed by injecting the molten sealing element material into the sealing element mold 300. The partially assembled filter assembly includes the filter element 110 encapsulated in the filter element carrier 120 having one or more holes therethrough interconnecting the first and second side portions 124 and 126 of the filter element carrier 120. And as discussed above, these holes may include either or both the first and second types of holes 122 and 123. The partially assembled filter assembly 100 may also include any one or more of the features formed in the first injection molding operation including the first and second holes 122 and 123, the channels 125 and 127, and mounting bushings B discussed above as well as other elements.

According to another aspect of the method for making the filter assembly 100, the molten sealing element material is injected from one or more input gates 320, shown in FIG. 3b, into one or more corresponding second holes 123 through the filter element carrier 120 in the second molding operation so as to form the first sealing element 132 on the first side of the filter element carrier 124 and to form the second sealing element 134 on the second side of the filter element carrier 120. According to this aspect of the invention, the one or more second holes 123 are located in filter element carrier 120 so as to facilitate distribution of the molten sealing element material injected into the sealing element mold and to form third sealing elements 136 through the second holes 123 after injection of the molten sealing material in the second molding operation. The molten sealing element material also flows through the one or more first holes 122 so as to distribute the molten sealing element material and to form the third sealing elements 136 during the second molding operation. In one configuration, the molten sealing element material is injected from input gates 320 located on only one side of the filter element carrier 120, and in other configurations the molten sealing element material is injected from input gates located on both sides of the filter element carrier 120. In some applications, only one input gate and a corresponding single second hole 123 is required for injecting the molten sealing element material, while in other applications several input gates 320 and corresponding second holes 123 are required for this purpose. In still other applications, however, the molten sealing member material may be injected into the sealing member mold 300 so as to form the sealing element 130 without the use of any second holes 123 through the filter element carrier 120.

The first and second holes 122 and 123 formed through the filter element carrier 120 are sized so as to control the amount of bonding, or retention, between the first and second sealing elements 132 and 134 and to control the flow of molten sealing element material during the second molding operation. Bonding or retention performance may also be controlled by the number and spacing of holes through the filter element carrier 120. The first and second holes 122 and 123 may, for example, have circular, or oval, or rectangular shapes. Generally, however, the size, spacing and number of holes depends on many variables, which are specific to each application. These variables include, among other considerations, the filter element opening size, molten sealing element material viscosity, sealing element retention or bonding requirements, and the geometric configuration of the sealing element.

In one embodiment, the filter element 110 is a nylon, or polyester, or stainless steel screen, and the filter element carrier 120 is a nylon material, or a glass fiber filled nylon material. The filter element 110 may be a woven mesh screen with substantially square openings having a width of between approximately 200 microns and approximately 400 microns. Non-woven filter elements with other opening shapes and sizes may also be used. The sealing element 130 is a liquid silicone rubber material having a durometer specification, which identifies the grade of sealing softness. In transmission applications, the durometer specification is between approximately 40 and approximately 80. In another embodiment, the sealing element is silicone rubber material having a crushed quartz crystal additive.

While the foregoing written description of the invention enables anyone skilled in the art to make and use what is at present considered to be the best mode of the invention, it will be appreciated and understood by anyone skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A method of making a filter assembly, comprising the steps of:
    encapsulating a filter element, having a plurality of openings, within a filter element carrier during a first operation;
    forming a first hole through the filter element carrier during the first operation such that the first hole interconnects a first side portion of the filter element carrier and a second side portion of the filter element carrier and exposes a portion of the filter element encapsulated within the filter element carrier and disposed between the first side portion and the second side portion of the filter element carrier;
    forming a first sealing element on the first side portion of the filter element carrier with a molten sealing element material during a second operation;
    forming a second sealing element on the second side of the filter element carrier with the molten sealing element material during the second operation; and
    conducting the molten sealing element material through the openings of the filter element portion exposed by the first hole through the filter element carrier so as to form a third sealing element whereby the first sealing element formed on the first side portion of the filter element carrier is interconnected to the second sealing element formed on the second side portion of the filter element carrier by the third sealing element formed through the openings of the filter element portion exposed by the first hole through the filter element carrier.

2. The method of claim 1, further comprising the steps of:
    forming a channel on at least one side portion of the filter element carrier during the first operation;
    forming the first hole through the channel of the filter element carrier during the first operation; and
    disposing at least partially one of the first and second sealing elements in the channel formed in the filter carrier element.

3. The method of claim 1, further comprising the steps of:
    forming a first channel on the first side portion of the filter element carrier during the first operation;
    forming a second channel on the second side portion of the filter element carrier during the first operation;
    forming the first hole through the filter element carrier during the first operation such that the first hole interconnects the first channel and the second channel and exposes a portion of the filter element encapsulated within the filter element carrier and disposed between the first channel and the second channel;
    disposing at least partially the first sealing element in the first channel during the second operation; and
    disposing at least partially the second sealing element in the second channel during the second operation, wherein the first sealing element at least partially disposed in the first channel is interconnected to the second sealing element at least partially disposed in the second channel by the third sealing element formed through the openings of the filter element portion which are exposed by the first hole interconnecting the first channel and the second channel.

4. The method of claim 3, further comprising the steps of:
    forming a plurality of first holes through the filter element carrier during the first operation such that the plurality of first holes interconnect the first channel and the second channel and expose a plurality of portions of the filter element encapsulated within the filter element carrier and disposed between the first channel and the second channel,
    whereby the first sealing element at least partially disposed in the first channel is interconnected to the second sealing element at least partially disposed in the second channel by a plurality of third sealing elements formed through the openings of those portions of the filter element which are exposed by the plurality of first holes interconnecting the first channel and the second channel.

5. The method of claim 3, further comprising the steps of:
    forming a second hole through the filter element carrier during the first operation so as to interconnect the first channel and the second channel in an area where the filter element, encapsulated within the filter element carrier, is not exposed by the second hole; and
    injecting molten sealing element material from an input gate, disposed upon only one side of the filter element carrier, into the second hole extending through the filter element carrier so as to form the first sealing element at least partially disposed in the first channel and to form the second sealing element at least partially disposed in the second channel.

6. The method of claim 1, further comprising the steps of:
    aligning the filter element within a filter element carrier mold by disposing a pilot pin of the filter element carrier mold through a pilot hole of the filter element;
    disposing opposite pin members of the filter element carrier mold in contact with opposite side portions of the filter element; and
    injecting a molten filter element carrier material into the filter element carrier mold so as to encapsulate the filter element within the filter element carrier during the first operation, whereby the opposite pin members form the first hole through the filter element carrier so as to expose the portion of the filter element encapsulated within the filter element carrier.

7. The method as set forth in claim 1, further comprising the step of:

fabricating the first, second, and third sealing elements from the same material such that the first, second, and third sealing elements comprise a unitary sealing member.

8. The method as set forth in claim 7, further comprising the step of:

fabricating said unitary sealing member, comprising said first, second, and third sealing elements, from a material which is different from the material from which the filter element carrier is fabricated.

9. The method as set forth in claim 8, further comprising the steps of:

fabricating said filter element carrier from a material selected from the group comprising nylon, and a glass fiber filled nylon; and fabricating said unitary sealing member from a material selected from the group comprising a liquid silicone rubber, and a liquid silicone rubber material having a crushed quartz crystal additive.

10. A filter assembly comprising:

a filter element having a plurality of openings;

a filter element carrier encapsulating the filter element and fabricated from a first material;

a hole disposed through the filter element carrier so as to expose a portion of the filter element encapsulated in the filter element carrier, the hole interconnecting a first side portion of the filter element carrier and a second side portion of the filter element carrier;

a first sealing element disposed on the first side portion of the filter element carrier;

a second sealing element disposed on the second side portion of the filter element carrier;

a third sealing element disposed through the hole in the filter element carrier and through openings of the exposed filter element portion such that the third sealing element interconnects the first sealing element disposed on the first side portion of the filter element carrier and the second sealing element disposed on the second side portion of the filter element carrier so as to form a unitary sealing member, wherein the unitary sealing member, comprising the first, second, and third sealing elements is fabricated from a second material which is different from the first material from which the filter element carrier is fabricated.

11. The filter assembly of claim 10, further comprising:

a first channel disposed on the first side portion of the filter element carrier; and a second channel disposed on the second side portion of the filter element carrier, wherein the hole through the filter element carrier interconnects the first channel and the second channel; and wherein the first sealing element is at least partially disposed in the first channel and the second sealing element is at least partially disposed in the second channel.

12. The filter assembly of claim 11, further comprising:

a plurality of holes disposed through the filter element carrier so as to expose a plurality of portions of the filter element encapsulated in the filter element carrier;

the plurality of holes interconnecting the first channel on the first side portion of the filter element carrier and the second channel on the second side portion of the filter element carrier; and the third sealing element being disposed through the plurality of holes in the filter element carrier and through openings of the plurality of filter element portions exposed by the plurality of holes.

13. The filter assembly of claim 10, wherein:

the first sealing element is disposed about an enclosed portion of the filter element; and the second sealing element is disposed about the enclosed portion of the filter element.

14. The filter assembly as set forth in claim 10, wherein:

said filter element carrier comprises a material selected from the group comprising nylon, and glass fiber filled nylon; and said unitary sealing element comprises a material selected from the group comprising liquid silicone rubber, and liquid silicone rubber having a crushed quartz crystal additive.

* * * * *